(12) United States Patent
Kang

(10) Patent No.: US 12,328,594 B2
(45) Date of Patent: Jun. 10, 2025

(54) METHOD AND APPARATUS FOR DETERMINING BASE STATIONS TO BE DEPLOYED BASED ON INTERFERENCE VALUES TO STATIONARY COMMUNICATION STATIONS

(71) Applicant: RAKUTEN MOBILE, INC., Tokyo (JP)

(72) Inventor: Kang Kang, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 17/767,256

(22) PCT Filed: Jun. 21, 2021

(86) PCT No.: PCT/JP2021/023415
§ 371 (c)(1),
(2) Date: Apr. 7, 2022

(87) PCT Pub. No.: WO2022/269689
PCT Pub. Date: Dec. 29, 2022

(65) Prior Publication Data
US 2024/0107326 A1    Mar. 28, 2024

(51) Int. Cl.
*H04W 16/14* (2009.01)
*H04W 48/16* (2009.01)
(Continued)

(52) U.S. Cl.
CPC ........... *H04W 16/14* (2013.01); *H04W 48/16* (2013.01); *H04W 48/20* (2013.01); *H04W 72/541* (2023.01)

(58) Field of Classification Search
CPC ..... H04W 16/14; H04W 48/16; H04W 48/20; H04W 72/541; H04W 16/18; H04W 24/02
See application file for complete search history.

(56) References Cited

U.S. PATENT DOCUMENTS

| 2013/0157650 | A1* | 6/2013 | Yavuz | H04W 24/02 |
| | | | | 455/422.1 |
| 2013/0188609 | A1* | 7/2013 | Harada | H04W 52/386 |
| | | | | 370/336 |

(Continued)

FOREIGN PATENT DOCUMENTS

| JP | 2010-166505 A | 7/2010 |
| JP | 2014-064219 A | 4/2014 |
| JP | 2017-152812 A | 8/2017 |

*Primary Examiner* — Sun Jong Kim
(74) *Attorney, Agent, or Firm* — Sughrue Mion, PLLC

(57) ABSTRACT

A communication control apparatus acquires deployment information related to deployment of a plurality of base stations, and location information related to positions of a plurality of stationary communication stations that perform communication by sharing a frequency band with the plurality of base stations, calculates interference values to the plurality of communication stations from the plurality of base stations using the deployment information and the location information, and selects, from the plurality of base stations, one or more of base stations that have the interference values lower than a predetermined interference threshold set for the plurality of communication stations, as a to-be-deployed base station in accordance with the deployment information.

11 Claims, 9 Drawing Sheets

(51) Int. Cl.
*H04W 48/20* (2009.01)
*H04W 72/541* (2023.01)

(56) References Cited

U.S. PATENT DOCUMENTS

| | | | |
|---|---|---|---|
| 2017/0026848 A1* | 1/2017 | Tsuda | H04W 16/14 |
| 2019/0037448 A1* | 1/2019 | Shan | H04W 60/04 |
| 2019/0059064 A1* | 2/2019 | Ghosh | H04W 56/0005 |
| 2020/0374872 A1* | 11/2020 | Wu | H04W 72/29 |

* cited by examiner

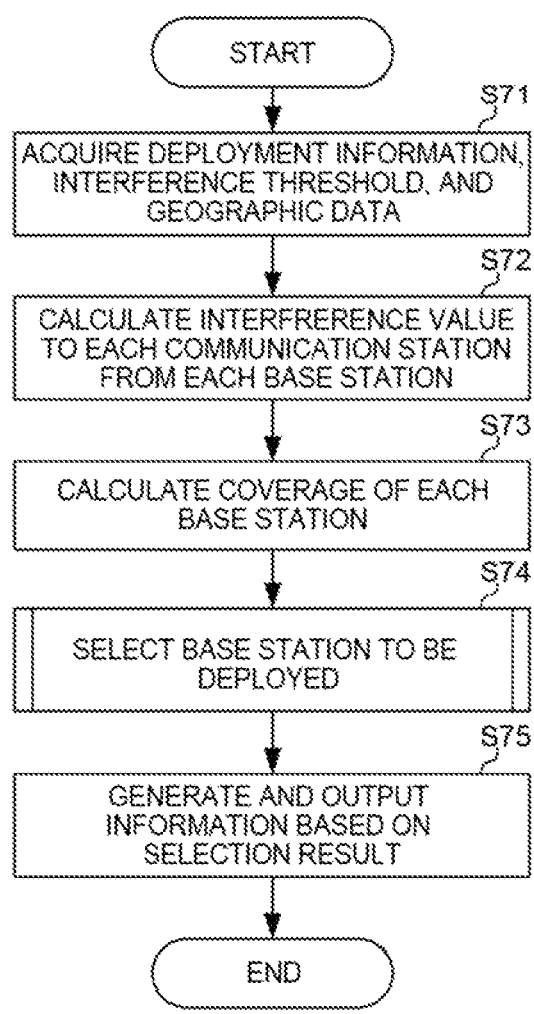

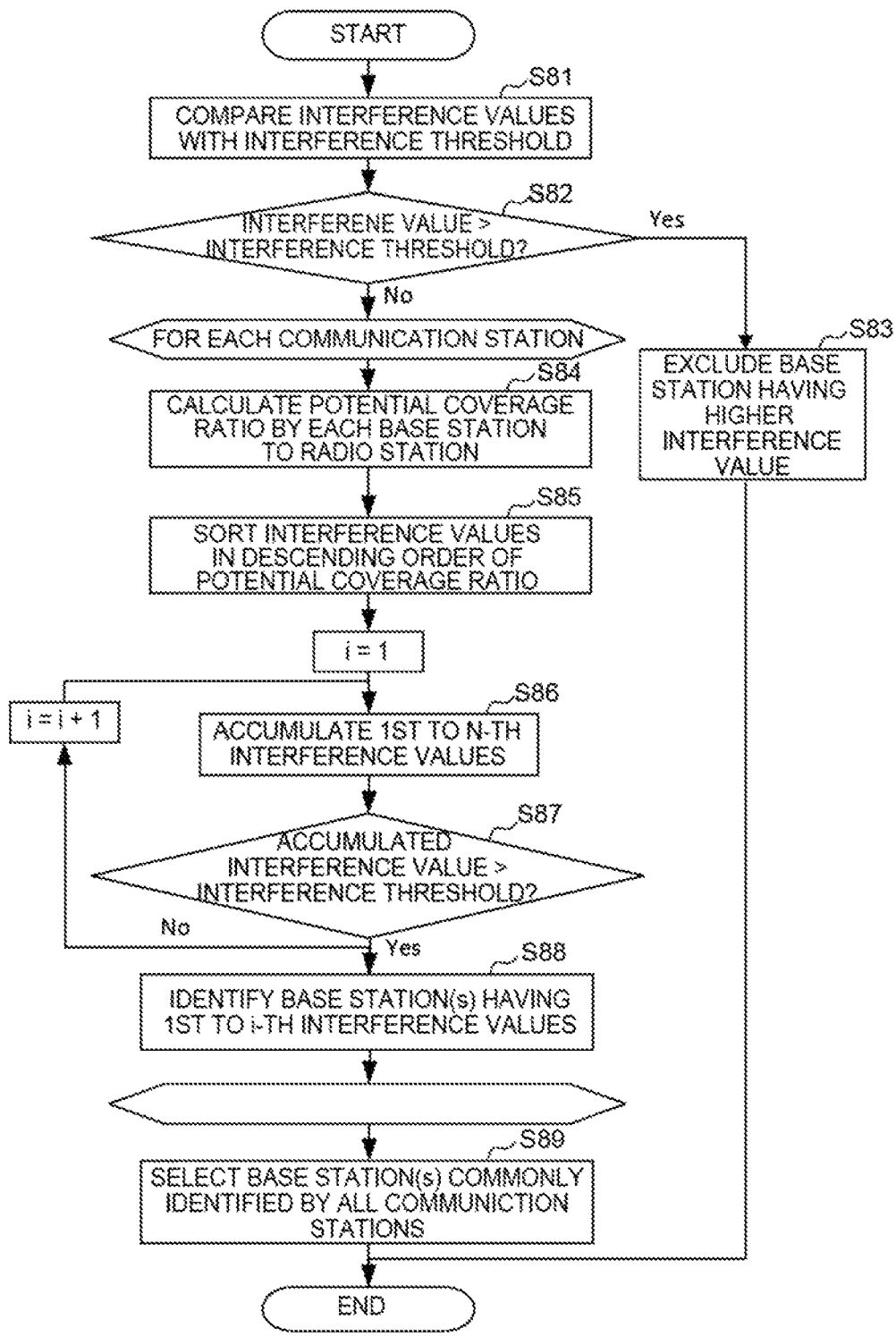

| WS | | Interence thr. [dBm/MHz] |
|---|---|---|
| WS21 | TH21 | -142 |
| WS22 | TH22 | -140 |

9b

| BS | Interence value for WS21 [dBm/MHz] | | Interence value for WS22 [dBm/MHz] | | Coverage [km^2] | |
|---|---|---|---|---|---|---|
| BS31 | I11 | -143.561756 | I12 | -164.7684602 | C1 | 18.86066774 |
| BS32 | I21 | -240.640918 | I22 | -179.4137878 | C2 | 11.78549646 |
| BS33 | I31 | -146.3895219 | I32 | -157.699561 | C3 | 29.22665626 |

9c

| BS | Potential coverage ratio for W21 | Potential coverage ratio for W22 |
|---|---|---|
| BS31 | 2.67623E+15 | 3.53341E+17 |
| BS32 | 2.19642E+25 | 1.65578E+19 |
| BS33 | 1.27272E+16 | 1.72082E+17 |

9d

| Interence value for WS21 [dBm/MHz] | | | Interence value for WS22 [dBm/MHz] | | |
|---|---|---|---|---|---|
| BS32 | I21 | -240.640918 | BS32 | I22 | -179.4137878 |
| BS33 | I31 | -146.3895219 | BS31 | I12 | -164.7684602 |
| BS31 | I11 | -143.561756 | BS33 | I32 | -157.699561 |

9e

| Accumulated Interence value for WS21 [dBm/MHz] | | AccumulatedS Interence value for WS22 [dBm/MHz] | |
|---|---|---|---|
| I21 | -240.640918 | I22 | -179.4137878 |
| I21+I31 | -143.561756 | I22+I32 | -157.6703933 |
| I21+I31+I11 | -141.7391424 | I22+I32+I12 | -156.8964552 |

METHOD AND APPARATUS FOR DETERMINING BASE STATIONS TO BE DEPLOYED BASED ON INTERFERENCE VALUES TO STATIONARY COMMUNICATION STATIONS

CROSS REFERENCE TO RELATED APPLICATIONS

This application is a National Stage of International Application No. PCT/JP2021/023415 filed on Jun. 21, 2021.

TECHNICAL FIELD

The present invention relates to a communication control apparatus, a communication control method, and a program thereof, and more particularly, to a technique for deploying a base station.

BACKGROUND ART

In the Third Generation Partnership Project (3GPP), standards for fourth generation (4G) called Long Term Evolution (LTE) and fifth generation (5G) called New Radio (NR) mobile communication systems have been developed.

The 4G network enables high-speed, low-latency communication and large-capacity communication are enabled, and for example, a terminal device is capable of utilizing a high-quality video with a large amount of data even outside home without delay. In the 5G network, in addition to high-speed, low-delay communication and high-capacity communication realized by 4G, high-reliability, low-delay services are expected to be provided in order to cope with technologies such as automated driving, remote control of drones and robots, and Internet of Things (IoT).

In order for a base station to provide communication services to a plurality of terminal devices, deployment of the base station may be performed based on a network design considering various conditions such as coverage, geographical conditions, topographical conditions, and population density.

In the 4G network (macro-cells, small-cells), base stations (4G base stations) is capable of providing a broad coverage and a connectivity to congested terminal devices (users). The 4G base station may be deployed in a particular location in compliance with a network design in view of such features and radio interferences. When a case occurs in which the base station and another communication system share the same frequency band, it is possible to allocate radio resources to the base station so that the base station and the other communication system do not share the same radio resource at the same time (Patent Literature 1 (Laid-open Publication of Japanese patent Application No. 2014-064219 A)).

LISTING OF REFERENCES

Patent Literature

PATENT LITERATURE 1: Laid-open Publication of Japanese patent Application No. 2014-064219 A

SUMMARY OF THE INVENTION

Problems to be Solved by the Invention

In the 5G network, base stations (5G base stations) in the network are assumed to share the same frequency as other communication systems such as a satellite communication system in the frequency band such as 3.7 GHz band. Therefore, in a case where the 5G base station is simply deployed based on a network design, when the 5G base station emits radio waves, the satellite communication may become unavailable due to radio interference. Thus, co-channel interferences with other communication systems, such as a satellite communication system, will be a major issue in the 5G network.

Radio resources can be allocated so as not to interfere with each other in the same channel according to the method disclosed in Patent Literature 1. However, it is complicated to perform such control after a large number of the 5G base stations are deployed.

Similar problems may also arise for not only the 5G network and the satellite communication system but also for two or more systems utilizing the same frequency band.

The present invention has been made in order to solve the above mentioned problems and an object thereof is to provide a communication control apparatus, a communication control method, and a program for appropriately deploying a base station in consideration of co-channel interference.

Solution to Problems

In order to solve the above mentioned problems, according to one aspect of the present invention, there is provided a communication control apparatus which comprises: an acquisition unit configured to acquire deployment information related to deployment of a plurality of base stations, and location information related to positions of a plurality of stationary communication stations that perform communication by sharing a frequency band with the plurality of base stations; an interference calculation unit configured to calculate interference values to the plurality of communication stations from the plurality of base stations using the deployment information and the location information; and a selection unit configured to select, from the plurality of base stations, one or more of base stations that have the interference values lower than a predetermined interference threshold set for the plurality of communication stations, as a to-be-deployed base station in accordance with the deployment information.

The predetermined interference threshold may be individually set for each of the plurality of communication stations, and the selection unit may accumulate, for each of the communication stations, the interference values to the each of communication stations from the plurality of base stations in a predetermined order, identify one or more base stations of which accumulated interference values do not exceed the interference threshold in total, and select, from the plurality of base stations, one or more base stations that are commonly identified for the plurality of communication stations, as the to-be-deployed base stations in accordance with the deployment information.

The predetermined order is an ascending order of the interference values to the communication stations from the base stations.

The communication control apparatus may further comprise an area calculation unit configured to calculate a service providing area by each of the plurality of base stations using the deployment information, and wherein the predetermined order may be a descending order of values obtained by dividing the service providing area by the interference values to the communication stations from the base stations.

The communication control apparatus may further comprise an output unit configured to generate and output at least one of information on one or more base stations selected by the selection unit and information on one or more base stations not selected by the selection unit.

The base stations are different base station apparatuses each other.

The base stations are base station apparatuses corresponding to each sector antenna provided in the same base station apparatus including a plurality of sector antennas.

The deployment information of each of the base station may include one or more of a latitude and/or a longitude with respect to each of the base stations, an antenna height of each of the base stations, a transmission power value by each of the base stations, antenna patterns of each of the base stations, and an orientation and a tilt of each of the base stations.

The base stations may be base stations in a fifth generation (5G) communication network, and the communication stations may be ground stations in a satellite communication network.

According to another aspect of the present invention, there is provided a communication control method which comprises the steps of: acquiring deployment information related to deployment of a plurality of base stations, and location information related to positions of a plurality of stationary communication stations that perform communication by sharing a frequency band with the plurality of base stations; calculating interference values to the plurality of communication stations from the plurality of base stations using the deployment information and the location information; and selecting, from the plurality of base stations, one or more of base stations that have the interference values lower than a predetermined interference threshold set for the plurality of communication stations, as a to-be-deployed base station in accordance with the deployment information.

According to yet another aspect of the present invention, there is provided a communication system including a plurality of base stations, a plurality of communication stations fixedly installed for performing communication by sharing a frequency band with the plurality of base stations, and a control apparatus, wherein the control apparatus comprises: an acquisition unit configured to acquire deployment information related to deployment of a plurality of base stations, and location information related to positions of a plurality of stationary communication stations that perform communication by sharing a frequency band with the plurality of base stations; an interference calculation unit configured to calculate interference values to the plurality of communication stations from the plurality of base stations using the deployment information and the location information; and a selection unit configured to select, from the plurality of base stations, one or more of base stations that have the interference values lower than a predetermined interference threshold set for the plurality of communication stations, as a to-be-deployed base station in accordance with the deployment information.

According to yet another aspect of the present invention, there is provided a communication control program for causing a computer to execute communication control processing, the program causing the computer to execute processing, which comprises: an acquisition process for acquiring deployment information related to deployment of a plurality of base stations, and location information related to positions of a plurality of stationary communication stations that perform communication by sharing a frequency band with the plurality of base stations; an interference calculation process for calculating interference values to the plurality of communication stations from the plurality of base stations using the deployment information and the location information; and a selection process for selecting, from the plurality of base stations, one or more of base stations that have the interference values lower than a predetermined interference threshold set for the plurality of communication stations, as a to-be-deployed base station in accordance with the deployment information.

Advantageous Effect of the Invention

According to the present invention, it makes it possible to appropriately deploy base stations in consideration of co-channel interference.

The above-mentioned objects, aspects and advantages of the present invention and the above-mentioned objects, aspects and advantages of the present invention will be understood by those skilled in the art from the following detailed description of the invention by referring to the accompanying drawings and the appended claims.

BRIEF DESCRIPTION OF DRAWINGS

FIG. 7 is a flowchart of processing executed by a communication control apparatus according to the second embodiment.

FIG. 8 is a flowchart showing a process of selecting a base station to be deployed according to the second embodiment.

FIG. 9 is a numerical example for explaining a procedure for selecting a base station to be deployed according to the second embodiment.

DESCRIPTION OF EMBODIMENTS

Figure 1:
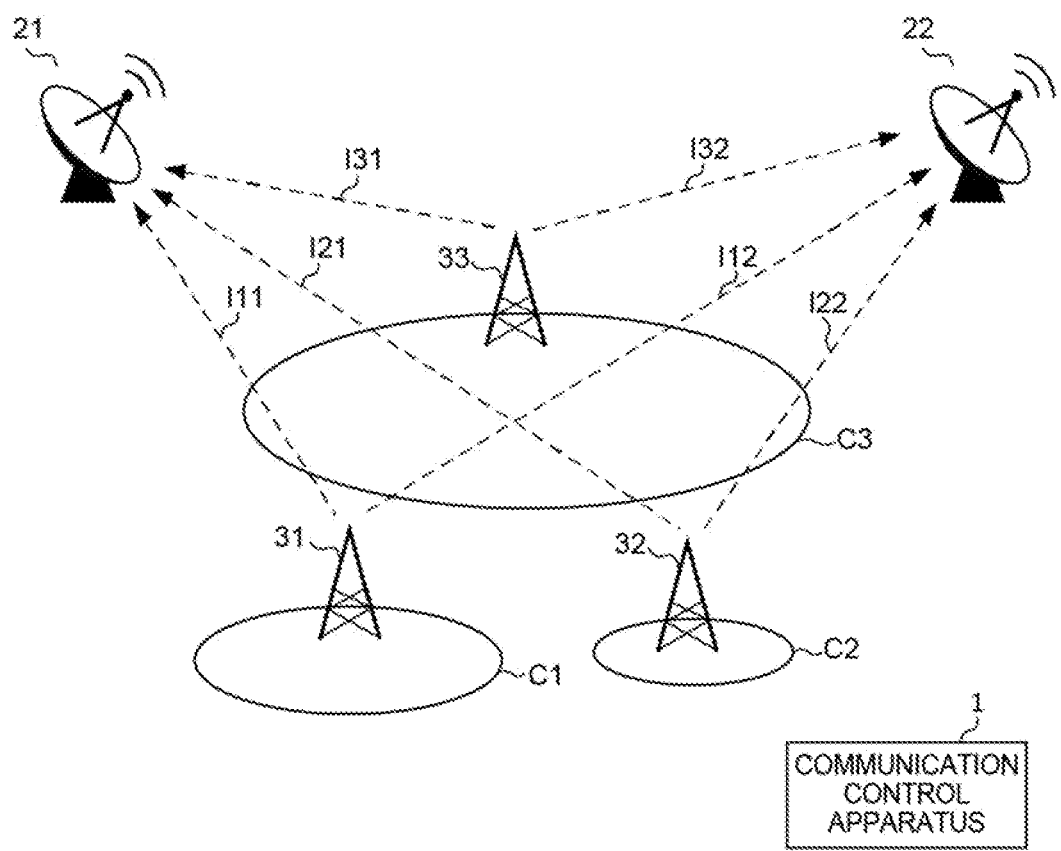
FIG. 1 is a schematic diagram showing a configuration example of a communication network system including a communication control apparatus according to embodiments of the present invention.

Hereinafter, embodiments of the present invention will be described in detail with reference to the accompanying drawings. Among the constituent elements disclosed below, those having the same function are denoted by the same reference numerals, and a description thereof is omitted. It should be noted that the embodiments disclosed herein are illustrative examples as means for implementing the present invention, and should be appropriately modified or changed depending on a configuration and various conditions of an apparatus to which the present invention is applied, and the present invention is not limited to the following embodiments. Furthermore, it should be noted that all of the combinations of features described in the following embodiments are not necessarily essential to the solution of the present invention.

First Embodiment

<Network System Configuration>

FIG. 1 is a schematic diagram showing a configuration example of a communication network system including a communication control apparatus according to the present embodiment.

As shown in FIG. 1, the communication network system of the present embodiment includes a communication control apparatus 1, communication stations 21 and 22, and base stations 31, 32, and 33. Here, it is assumed that the communication stations 21 and 22 and the base stations 31, 32, and 33 perform communication by sharing the same frequency band.

In the present embodiment, the communication stations 21 and 22 are assumed to be ground communication stations (Ground stations) designed for the satellite communication network by the satellite communication carrier and be stationary stations. The communication stations 21 and 22 are capable of communicating with artificial satellites such as a spacecraft and also receiving radio waves from radio sources. For example, the artificial satellites are Communication Satellites (CS), Broadcasting Satellites (BSs), or the like.

Also, in the present embodiment, the base stations 31, 32, 33 are assumed to be base stations in a fifth generation (5G) communication network, referred to as New Radio (NR), under the Third Generation Partnership Project (3GPP). In the 5G specification, the 5G base station is also referred to as a gNodeB or a gNBs.

The base stations 31, 32, and 33 are capable of providing a communication service to one or more terminal devices (not shown) in a range of coverages (communication service providing area) C1, C2, and C3, respectively. The base stations 31, 32, and 33 may be base stations capable of providing a plurality of slices (i.e., services). Types of slices include, for example, mMTC, URLLC and eMBB. mMTC is an abbreviation for massive Machine Type Communications and URLLC is an abbreviation for Ultra-Reliable and Low Latency Communications, and eMBB is an abbreviation for enhanced Mobile Broad Band.

The deployment of base stations may be based on a network design that takes into account various conditions such as coverage, geographic conditions, topographical conditions, and population density.

On the other hand, in 5G, it is assumed that base stations share the same frequency as communication stations (ground stations) for satellite communications in the frequency band, such as the 3.7 GHz band. Therefore, in a case where the base station is simply deployed based on the network design, when the base station emits radio waves, there may be an effect that the satellite communication becomes unavailable due to radio interference.

In the present embodiment, the communication control apparatus 1 has a function of selecting (determining) one or more base stations to be actually deployed in consideration of interference with the communication stations 21 and 22 from the base stations 31, 32, and 33, respectively.

The interference value to each of the communication stations 21 and 22 from the base station 31 in the same frequency band shared between the communication stations 21 and 22 and the base stations 31, 32 and 33 is represented as I11 and I12. Similarly, the interference value to each of the communication stations 21 and 22 from the base station 32 is represented as I21 and I22, and the interference value to each of the communication stations 21 and 22 from the base station 33 is represented as I31 and I32.

It should be noted that, in the present embodiment, the communication stations 21 and 22 are assumed to be communication stations (ground stations) for satellite communication, the base stations 31, 32, and 33 are assumed to be the 5G base stations for macro-cells, but the present embodiment can be applied to any radio communication system sharing the same Frequency Band.

<Functional Configuration of the Communication Control Apparatus>

Figure 2:
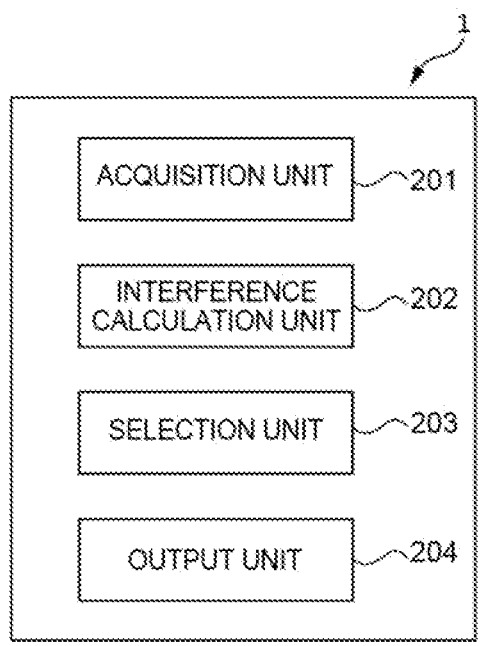
FIG. 2 is a block diagram showing an example of a functional configuration of the communication control apparatus according to the first embodiment.

FIG. 2 is a block diagram showing an example of a functional configuration of the communication control apparatus 1 according to the present embodiment.

Figure 3:
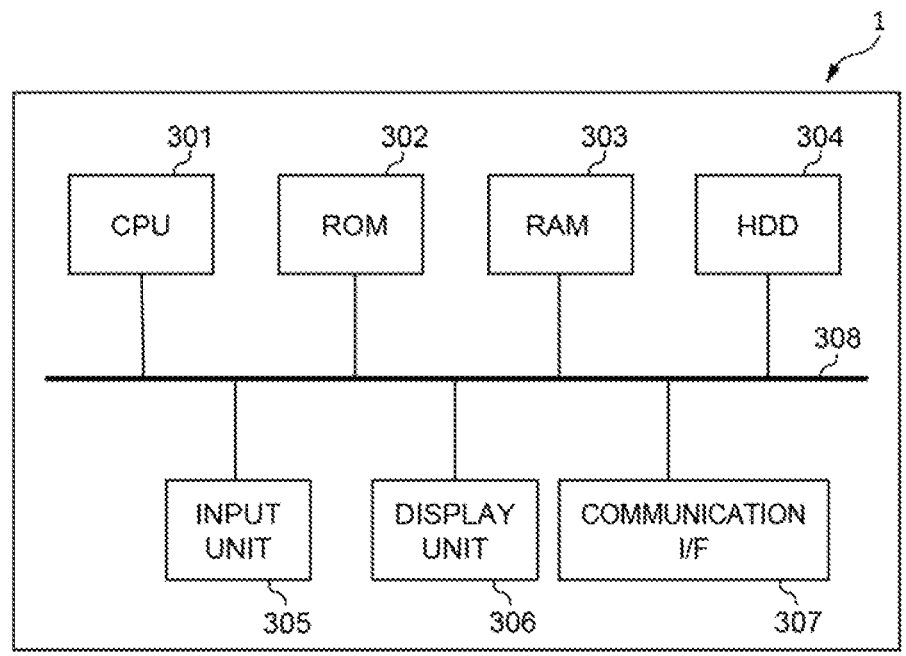
FIG. 3 is a block diagram showing an example of a hardware configuration of a communication control apparatus according to embodiments of the present invention.

Of the functional modules of the communication control apparatus 1 illustrated in FIG. 2, functions which can be realized by software are realized by a program for providing the functions of the functional modules (including a communication control program executable to the computer described below) being stored in a memory such as a ROM 302 (FIG. 3) and being read out to a RAM 303 (FIG. 3) and executing by a CPU 301 (FIG. 3). As for the functions realized by hardware, for example, by using predetermined compilers, dedicated circuits may be automatically generated on FPGA from programs for realizing the functions of the respective functional modules. FPGA is an abbreviation for Field Programmable Gate Array. In addition, Gate Array circuitry may be formed in the same manner as FPGA so as to be implemented as hardware. It may be realized by Application Specific Integrated Circuit (ASIC). The configuration of the functional blocks shown in FIG. 2 is an example, and a plurality of the functional blocks may constitute one functional block, or any one of the functional blocks may be divided into blocks for performing a plurality of functions.

As shown in FIG. 2, the communication control apparatus 1 comprises, as its functional configuration, an acquisition unit 201, an interference calculation unit 202, a selection unit 203, and an output unit 204.

The acquisition unit 201 acquires information on the deployment of a base station that is designed in advance based on a network design or the like, hereinafter referred to as deployment information. The deployment information includes, for example, one or more of a latitude, a longitude, an antenna height, a transmit power value (e.g., a maximum transmit power value) for one base station, an antenna pattern of the base station antenna, an orientation and a tilt of the base station antenna. The acquisition unit 201 may acquire the deployment information by a user's input operation via an input unit 305 (FIG. 3). Alternatively, the acquisition unit 201 may acquire the deployment information by a process of receiving the deployment information from an external device via a communication OF 307 shown in FIG. 3. Alternatively, the acquisition unit 201 may acquire the deployment information previously stored in a storage unit such as the RAM 303 (FIG. 3).

The deployment information is associated with identifying information to identify a base station. For example, the deployment information includes an identification information of a base station.

In the case of the configuration of the network system shown in FIG. 1, the acquisition unit 201 acquires the deployment information for each of the base stations 31, 32, and 33.

Furthermore, the acquisition unit 201 acquires a threshold (unit is, for example, dBm/MHz) for an allowable interference (hereinafter referred to an interference threshold) to be set in one or more communication stations sharing the same frequency band as the base station. The interference threshold is used to select one or more base stations for eventual deployment based on the deployment information described above. In addition, the interference threshold may be set in common in the one or more communication stations, or may be set individually.

It is assumed that the interference threshold is a value calculated beforehand by a system noise temperature, an interference frequency band, an integration time, etc. of a receiving system of the communication station concerned. The interference threshold can be calculated for long time and short time use, either value for the long time use or the short time use may be used as the interference threshold.

Similar to the above-described deployment information, the acquisition unit 201 may acquire the interference threshold by a user's input operation via the input unit. Alternatively, the acquisition unit 201 may acquire the interference threshold by a process of receiving the interference threshold from an external device via the communication IN 307 shown in FIG. 3. Alternatively, the acquisition unit 201 may acquire the interference threshold stored in advance in the storage unit. Alternatively, the acquisition unit 201 may be configured to calculate the interference threshold when needed information is input.

In the case of the configuration of the network system shown in FIG. 1, the acquisition unit 201 acquires the interference threshold for each of the communication stations 21 and 22.

In addition, the acquisition unit 201 acquires location information (hereinafter referred to as geographic data) including the geographic location of the communication station sharing the same frequency band as the base station.

Similar to the above-described deployment information, the acquisition unit 201 may acquire the geographic data by a user's input operation via the input unit. Alternatively, the acquisition unit 201 may acquire the geographic data by receiving the geographic data from an external device via the communication OF shown in FIG. 3. Alternatively, the acquisition unit 201 may acquire the geographic data stored in the storage unit in advance.

In the case of the configuration of the network system shown in FIG. 1, the acquisition unit 201 acquires the geographic data for each of the communication stations 21 and 22.

The acquisition unit 201 outputs the acquired deployment information and geographic data to the interference calculation unit 202, and outputs the interference threshold to the selection unit 203.

The interference calculation unit 202, based on the deployment information and the geographic data acquired from the acquisition unit 201, estimates and calculates an interference value from the base station to a communication station sharing the same frequency band as the base station (unit is, for example, dBm/MHz). The interference calculation unit 202 may calculate each interference value using, for example, an interference computing simulator.

In the case of the configuration of the network system shown in FIG. 1, the interference calculation unit 202 calculates interference values I11 and I12 to the communication stations 21 and 22 from the base station 31, interference values I21 and I22 to the communication stations 21 and 22 from the base station 32, and interference values I31 and I32 to the communication stations 21 and 22 from the base station 33, respectively.

The interference calculation unit 202 outputs a plurality of the calculated interference values to the selection unit 203.

The selection unit 203 selects (determines) one or more base stations to be deployed according to the deployment information based on the interference values output from the interference calculation unit 202 and the interference threshold output from the acquisition unit 201. The selection procedure will be described later with reference to FIG. 4.

The output unit 204 generates and outputs information of the base stations selected by the selection unit 203. For example, the output unit 204 generates and outputs a list of one or more base stations selected by the selection unit 203. Further, the output unit 204 may generate and output information relating to one or more base stations that have not been selected. For example, the output unit 204 may generate and output information instructing a re-deployment plan of the one or more base stations that have not been selected or information for requesting cancellation of deployment.

<Communication Control Unit Hardware Configuration>

FIG. 3 is a diagram showing a non-limiting example of the hardware configuration of the communication control apparatus 1 according to the present embodiment.

The communication control apparatus 1 according to the present embodiment can be implemented on any computer or on any other processing platform. The communication control apparatus 1 may be implemented in a general-purpose server device comprising a cloud, or may be implemented in a dedicated server device.

Referring to FIG. 3, the communication control apparatus 1 is illustrated as being implemented in a single computer, but the communication control apparatus 1 according to the present embodiment may be implemented in a computer system including a plurality of computers. The plurality of computers may be interconnected by wired or wireless networks so as to be able to communicate with each other.

As shown in FIG. 3, the communication control apparatus 1 may include a Central Processing Unit (CPU) 301, a Read Only Memory (ROM) 302, a Random Access Memory (RAM) 303, a Hard Disk Drive (HDD) 304, an input unit 305, a display unit 306, a communication IN 307, and a system bus 308. The communication control apparatus 1 may also include an external memory.

The CPU 301 controls an overall operation of the communication control apparatus 1, and controls each of the constituent elements (the ROM 302 to the communication IN 307) via the system bus 308 which is a data transmission path.

The ROM 302 is a non-volatile memory for storing a control program or the like required for the CPU 301 to execute processing. The program may be stored in an external memory such as a non-volatile memory or a removable storage medium (not shown) such as the HDD 304, a Solid State Drive (SSD), or the like.

The RAM 303 is a volatile memory and functions as a main memory, a work area, and the like of the CPU 301. That is, the CPU 301 loads a required program or the like from the ROM 302 into the RAM 303 at the time of executing processing and executes a program or the like to realize various functional operations.

The HDD 304 stores, for example, various data and various information required when the CPU 301 performs processing using a program. Furthermore, the HDD 304, for example, various data and various information obtained by the CPU 301 performs processing using a program or the like is stored.

The input unit 305 is configured by a pointing device such as a keyboard or a mouse. The display unit 306 is configured by a monitor such as a Liquid Crystal Display (LCD). The display unit 306 may provide a GUI (Graphical User Interface) for instructing the communication control apparatus 1 to input various parameters used in the base station determination process, communication parameters used in communication with other apparatuses, and the like.

The communication IN 307 is an interface for controlling communication between the communication control apparatus 1 and an external apparatus.

The functions of at least some of the elements of the communication control apparatus 1 shown in FIG. 2 may be realized by the CPU 301 executing programs. However, at least some of the functions of the respective elements of the communication control apparatus 1 shown in FIG. 2 may operate as dedicated hardware. In this situation, the dedicated hardware operates based on the control of the CPU 301.

<Process Flow>

Figure 4:
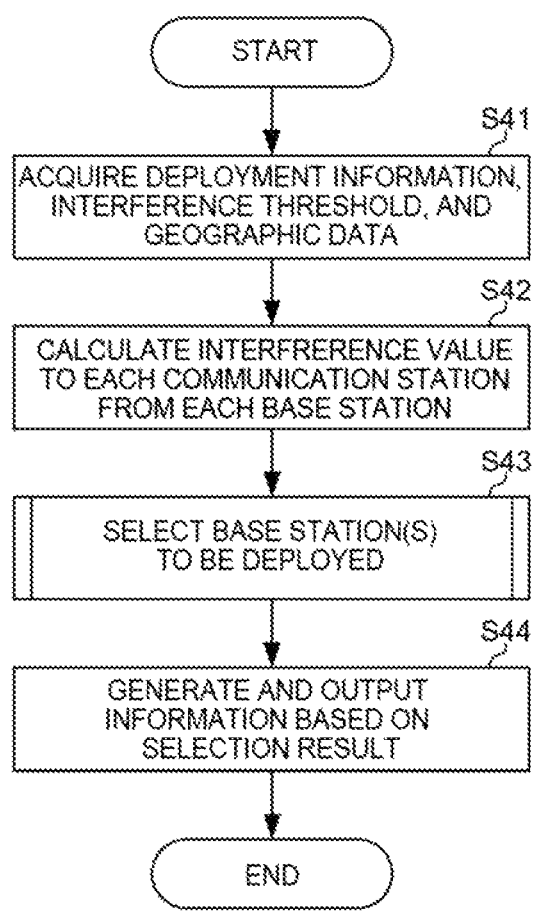
FIG. 4 is a flowchart of processing executed by the communication control apparatus according to the first embodiment.

FIG. 4 shows a flowchart of processing executed by the communication control apparatus 1 according to the present embodiment.

This processing is started, for example, by performing a predetermined operation on the input unit 305 when a communication carrier that performs base station deployment determines base station deployment. In the following description of FIG. 4, reference will be made to the configuration of the network system of FIG. 1.

In S41, the acquisition unit 201 of the communication control apparatus 1 acquires the deployment information for the base stations 31, 32, and 33, the interference thresholds for the communication stations 21 and 22, and the geographic data for the communication stations 21 and 22.

The deployment information includes, for example, one or more of a latitude, a longitude, an antenna height, a transmit power value (e.g., a maximum transmit power value), an antenna pattern of the base station antenna, an orientation and a tilt of the base station antenna for the base station 31, 32, 33.

The interference threshold is a threshold for allowable interference set in the communication stations 21 and 22. In the description, the interference threshold for the ground station 21 is referred to as TH21, and the interference threshold for the ground station 22 is referred to as TH22.

The geographic data is information including the geographic positions of the communication stations 21 and 22.

The acquisition unit 201 outputs the deployment information, the interference threshold, and the geographic data to the interference calculation unit 202.

In S42, the interference calculation unit 202 estimates and calculates the interference value to each communication station sharing the same frequency band as each base station from each base station based on the deployment information and the geographic data output from the acquisition unit 201. Specifically, the interference calculation unit 202 calculates the interference values I11 and I12 to the communication stations 21 and 22 from the base station 31, the interference values I21 and I22 to the communication stations 21 and 22 from the base station 32, and the interference values I31 and I32 to the communication stations 21 and 22 from the base station 33, respectively.

The interference calculation unit 202 outputs the calculated interference values to the selection unit 203.

In S43, the selection unit 203 selects (determines) one or more base stations to be deployed according to the deployment information based on the interference value output from the interference calculation unit 202 and the interference threshold value output from the acquisition unit 201.

Figure 5:
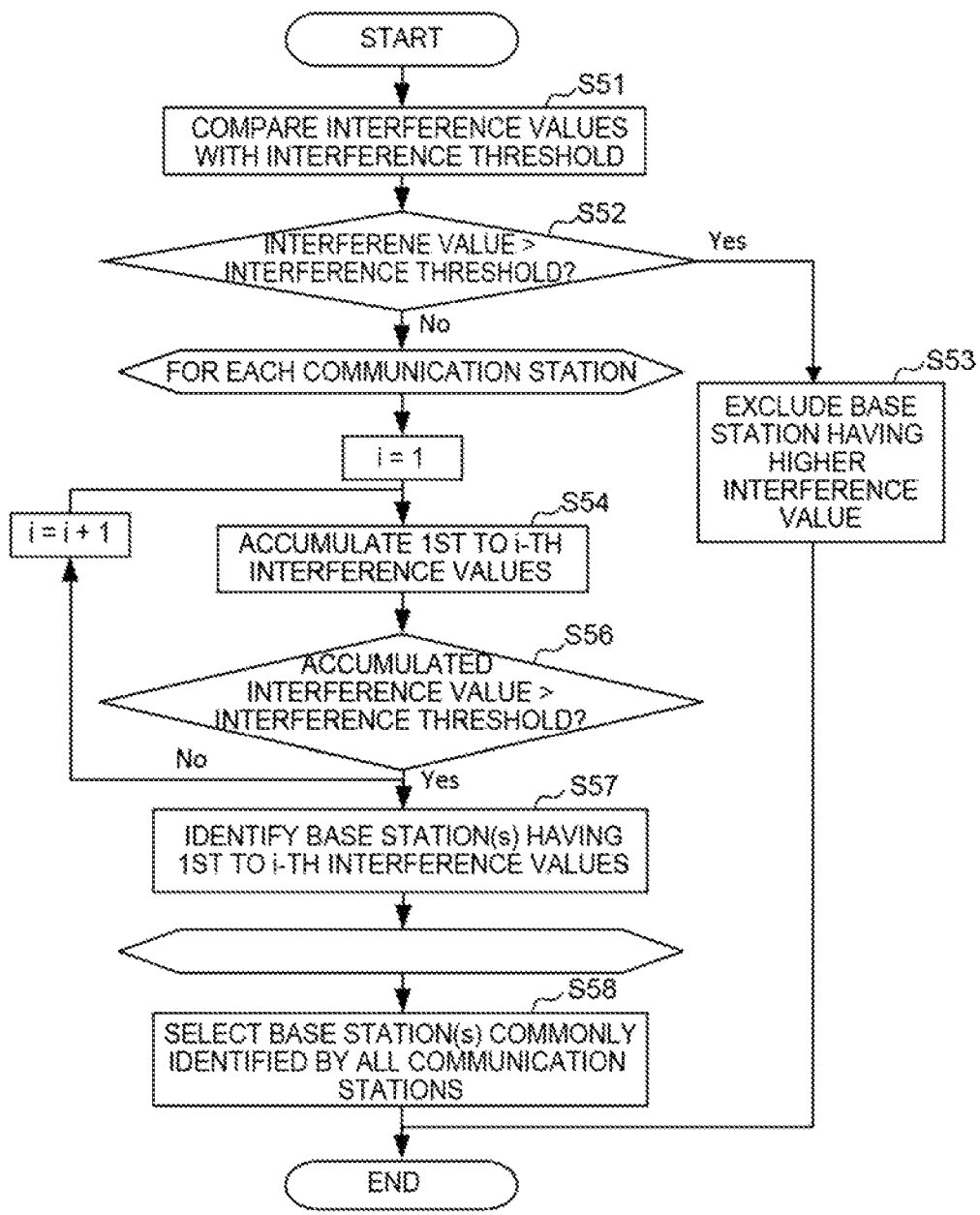
FIG. 5 is a flowchart showing a process of selecting a base station to be deployed according to the first embodiment.

FIG. 5 is a flowchart showing a process of selecting one or more base stations to be deployed, performed by the selection unit 203 according to the present embodiment.

In S51, the selection unit 203 compares all the interference values output from the interference calculation unit 202 with all the interference thresholds output from the acquisition unit 201. Specifically, the selection unit 203 compares the interference values I11, I12, I21, I22, I31, and I32 with the interference threshold TH21 for the communication stations 21 and 22 and TH22, respectively. In a case where the interference value is higher than at least one of the interference thresholds TH21 and TH22 (YES in S52), the selection unit 203 excludes the base station having the high interference value from the selection target (S53). In a case where there are no interference values higher than at least one of the interference thresholds TH21 and TH22 (No in S52), the selection unit 203 performs processing of S54 to S57 as processing for each of the communication stations 21 and 22.

As an example of processing of S54 to S57, the processing to the communication station 21 will be described. It is assumed that the interference values I11, I21, and I31 with respect to the communication station 21 by the base stations 31, 32, and 33 are set in order as the first to third interference values (indexed in order from the first (1st)). It should be noted that this order is an example and may be set as the first to third interference values in the order of I31, I21, and I11. It may also be numbered in order from lower interference values, considering that lower interference values allow more base stations to be deployed.

In S54, the selection unit 203 accumulates the first to i-th interference values (in a case of i=1, the first interference value is used), and the process proceeds to S56. In S56, the selection unit 203 compares the accumulated interference value with the interference threshold TH21 for the communication station 21. In a case where the accumulated interference value is less than or equal to the interference threshold TH21 (No in S56), the selection unit 203 increments i, and repeats the processing of S54 to S56.

In a case where the accumulated interference value is higher than the interference threshold TH21 (Yes in S56), the process proceeds to S57 to determine that one or more base stations having the first to i-th interference values are identified for the communication station 21 (one or more base stations constituting the first to i-th interference values).

Subsequently, the selection unit 203 performs the processing of S54 to S57 for the communication station 22, and in a case where one or more base stations for the communication stations 21 and 22 is specified, the processing proceeds to S58.

In this example, an example has been described in which the processing of S54 to S57 is performed for the communication station 22 after the processing of S54 to S57 for the communication station 21, but both processing are independent, and therefore the order of the processing may be reversed or each processing may be performed simultaneously.

In S58, the selection unit 203 selects one or more base stations commonly identified in the process of S57 for all communication stations (i.e., the communication stations 21 and 22), outputs identification information identifying the selected one or more base stations as a selection result to the output unit 204, and ends the process.

Through such processing, one or more base stations having an interference value accumulated within a range not exceeding the interference threshold are selected (determined) as deployed base stations.

Returning to the description of FIG. 4, in S44, the output unit 204 generates and outputs information based on the selection result by the selection unit 203. For example, the output unit 204 generates and outputs a list of identification information of one or more base stations selected by the selection unit 203. Further, the output unit 204 may generate and output information relating to one or more base stations that has not been selected. For example, the information may be information for instructing a re-deployment plan of one or more base stations that have not been selected, or information for requesting cancellation of deployment.

Thus, according to the present embodiment, from a plurality of base stations to be deployed, considering interference with a plurality of ground stations, so as not to exceed the interference value allowed by all ground stations, it is possible to select one or more base stations.

Also, by outputting information about one or more base stations selected by such processing, the carrier can consider redeployment of base stations or cancellation of the deployment itself that are inappropriately scheduled to be deployed in terms of interference, and as a result, can provide communication services with reduced effects due to interference.

Second Embodiment

In the first embodiment, the communication control apparatus 1 calculates the interference value to each ground station from each base station, and selects one or more base stations to be deployed based on the interference value. In the present embodiment, the communication control apparatus 1 calculates the coverage (i.e., service providing area) of each base station in addition to the interference value of each base station with respect to each ground station, and selects one or more base stations to be deployed based on the interference value and the coverage.

A large coverage means a wide range in which communication services may be provided and indicates a preferable state from the standpoint of the number of base stations installed. On the other hand, a high interference value affects the communication quality. Therefore, the communication control apparatus 1 according to the present embodiment selects one or more base stations to be deployed based on the deployment information in consideration of both the parameters of the coverage and the interference value.

Hereinafter, points different from the first embodiment will be described, and description of common matters will be omitted.

<Functional Configuration of Communication Control Apparatus>

Figure 6:
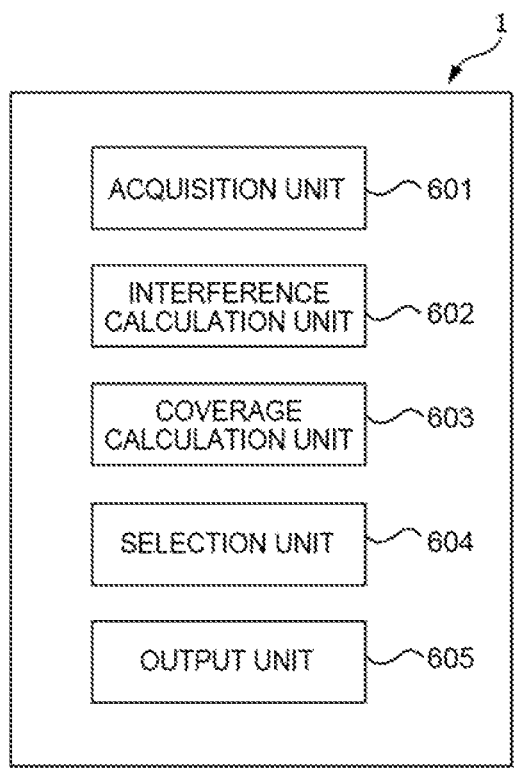
FIG. 6 is a block diagram showing an example of a functional configuration of the communication control apparatus according to the second embodiment.

FIG. 6 is a block diagram showing an example of a functional configuration of the communication control apparatus 1 according to the present embodiment.

Since the functions of the acquisition unit 601, the interference calculation unit 602, and the output unit 605 are the same as the acquisition unit 201, the interference calculation unit 202, and the output unit 204 of FIG. 2 described in the first embodiment, respectively, description thereof will be omitted.

The coverage calculation unit 603 functions as a region calculation unit that calculates a geographic coverage area (hereinafter referred to as coverage) for each base station based on the deployment information output from the acquisition unit 601. The coverage is represented by, for example, a diameter (kilometers, etc.) or an area (square kilometers, etc.). The coverage calculation unit 603 may calculate each coverage using, for example, a coverage calculation simulator.

In the case of the configuration of the network system shown in FIG. 1, the coverage calculation unit 603 calculates coverages C1, C2, and C3 as the coverages of the base stations 31, 32, and 33. The coverage calculation unit 53 outputs the calculated coverage of each base station to the selection unit 604.

The selection unit 604 selects (determines) one or more base stations to be deployed according to the deployment information based on the interference values output from the interference calculation unit 602, the interference threshold value output from the acquisition unit 601, and a plurality of coverages output from the coverage calculation unit 604. The selection procedure will be described later with reference to FIG. 7.

<Process Flow>

FIG. 7 shows a flowchart of processing executed by the communication control apparatus according to the present embodiment.

This processing is started, for example, by performing a predetermined operation on the input unit 305 when a communication carrier that performs base station deployment determines base station deployment. In the following description of FIG. 7, reference will be made to the configuration of the network system of FIG. 1.

In S71, the acquisition unit 601 of the communication control apparatus 1 acquires the deployment information for the base stations 31, 32, and 33, the interference thresholds for the communication stations 21 and 22, and the geographic data for the communication stations 21 and 22.

The acquisition unit 601 outputs the deployment information, the interference threshold, and the geographic data to the interference calculation unit 602.

In S72, the interference calculation unit 602 estimates and calculates an interference value to each communication station sharing the same frequency band as each base station from each base station based on the deployment information and the geographic data output from the acquisition unit 601. Specifically, the interference calculation unit 602 calculates the interference values I11 and I12 to the communication stations 21 and 22 from the base station 31, the interference values I21 and I22 to the communication stations 21 and 22 from the base station 32, and the interference values I31 and I32 to the communication stations 21 and 22, from the base station 33, respectively.

Interference calculation unit 602 outputs a plurality of the calculated interference values to the selection unit 604.

In S73, the coverage calculation unit 604 calculates the coverage of each base station based on the deployment information output from the acquisition unit 601. Specifically, the coverage calculation unit 604 calculates the coverages C1, C2, and C3 of the base stations 31, 32, and 33, respectively.

The coverage calculation unit 604 outputs the plurality of the calculated coverage to the selection unit 604.

The order of the processing of S72 and S73 may be reversed or the processing of S72 and S73 may be performed simultaneously.

In S74, the selection unit 604 selects (determines) one or more base station to be deployed according to the deployment information based on the interference value output from the interference calculation unit 602, the coverage output from the coverage calculation unit 604, and the interference threshold output from the acquisition unit 601.

FIG. 8 is a flowchart showing a process of selecting a base station to be deployed, which is a process of the selection unit 604 according to the present embodiment.

In S81, the selection unit 604 compares all the interference values output from the interference calculation unit 602 with all the interference thresholds output from the acquisition unit 201. Specifically, the selection unit 604 compares the interference values I11, I12, I21, I22, I31, and I32 with the interference thresholds TH21 and TH22 for the communication stations 21 and 22, respectively. In a case where the interference value is higher than at least one of the interference thresholds TH21 and TH22 (YES in S82), the selection unit 604 excludes the base station having the high interference value from the selection target (S83). In a case where there is no interference value higher than at least one of the interference thresholds TH21 and TH22 (NO in S82), the selection unit 604 performs the processing of S84 to S88 as the processing for each of the communication stations 21 and 22.

As an explanation of the processing of S84 to S88, for example, the processing to be performed on the communication station 21 will be described.

In S84, the selection unit 604 calculates a value obtained by dividing the coverages C1, C2, and C3 of the base stations 31, 32, and 33 by the interference values I11, I21, and I31 for the communication station 21, respectively (coverage/interference value). The value of the coverage/interference value indicates a coverage ratio with respect to the coverage by the base station in consideration of interference and is hereinafter referred to as a potential coverage ratio. The selection unit 604 calculates the potential coverage ratios C1/I11, C2/I21, C3/I31.

In step S85, the selection unit 604 sorts the interference values in descending order of the potential coverage ratio calculated in step S84. For example, in a case where the potential coverage ratios are C1/I11<C2/I21<C3/I31, I31, I21, and I11 are arranged in that order and indexed from 1. A high potential coverage ratio means a relatively high coverage ratio, even in view of interference. Therefore, the selection unit 604 preferentially selects a base station having a high potential coverage ratio.

In S86, the selection unit 604 accumulates the first to i-th interference values (when i=1, the first interference value is used), and the process proceeds to S87. In S87, the selection unit 604 compares the accumulated interference value with the interference threshold TH21 for the communication station 21. In a case where the accumulated interference value is less than or equal to the interference threshold TH21 (NO in S87), the selection unit 604 increments i and repeats the processing of S86 to S87.

In a case where the accumulated interference value is higher than the interference threshold TH21 (Yes in S87), the process proceeds to S88, in which a base station (one or more base stations constituting the first to i-th interference values) having the first to i-th interference values is identified for the communication station 21.

Subsequently, the selection unit 604 performs the processing of S84 to S88 to the communication station 22, and when the base station for the communication stations 21 and 22 is selected, the processing proceeds to S89.

In this example, an example has been described in which the processing of S84 to S88 are performed for the communication station 22 after the processing of S84 to S88 for the communication station 21, but since both processing are independent, the order of the processing may be reversed or both processing may be performed simultaneously.

In S89, the selection unit 604 selects one or more base station commonly specified in the processing of S57 for each of the all communication stations (that is, the communication stations 21 and 22), outputs the information for identifying the selected base station to the output unit 605 as the selection result, and terminates the processing.

Such processing may select one or more base stations that have a higher potential coverage and an accumulated interference value within a range that does not exceed the interference threshold as deploying base stations.

Returning to the description of FIG. 7, in S75, the output unit 605 generates and outputs information based on the selection result by the selection unit 203. For example, the output unit 605 generates and outputs a list of identification information of the one or more base stations selected by the selection unit 604. The output unit 605 may generate and output information on one or more base stations that have not been selected. For example, the information may be information for instructing a re-deployment plan of one or more base stations that have not been selected, or information for requesting cancellation of deployment.

<Examples of Base Station Selection Procedures>

Next, a specific example of a procedure for selecting a base station to be deployed according to the present embodiment will be described with reference to FIG. 9. FIG. 9 is a numerical example for explaining a procedure for selecting a base station to be deployed according to the present embodiment. In the following description of FIG. 9, reference will be made to the configuration of the network system of FIG. 1 and the flowcharts of FIGS. 7 and 8. In FIG. 9, the base station is denoted by BS and the communication station is denoted by WS.

A table 9a shows the interference thresholds TH21, TH22 for the communication stations (WS) 21 and 22 acquired by the acquisition unit 601 (S71 in FIG. 7).

A table 9b shows the interference values and the coverages calculated by the interference calculation unit 602 (S72 in FIG. 7). The interference values include interference values I11 and I12 to the communication stations 21 and 22 from the base station (BS) 31, interference values I21 and I22 to the communication stations 21 and 22 from the base station 32, respectively, and interference values I31 and I32 to the communication stations 21 and 22 from the base station 33, respectively. The coverages includes the coverages C1, C2, C3 of the base stations 31, 32, 33.

A table 9c shows the potential coverage ratios (coverage/interference value) calculated from the interference value and coverage shown in the table 9b (S84 in FIG. 8). The potential coverage ratio is calculated for each base station and each communication station.

A table 9d shows the result of sorting the interference values (the table 9b) in descending order of the potential coverage ratio shown in the table 9c (S85 in FIG. 8). As shown in FIG. 9D, for the communication station 21, the potential coverage ratio decreases in the order of the base stations 32, 33, and 31, and the sorting result becomes in the order of I21, I31, and I11. Similarly, for the communication station 22, the potential coverage ratio decreases in the order of the base stations 32, 31, 33, and the sort result becomes in the order of I22, I12, and I32.

A table 9e shows a result of accumulating the interference values sorted as shown in the table 9d in order for each communication station. In this example, it is assumed that the accumulation process is performed after converting the interference value [dBm] to mW using the conversion equation dBm=10 log 10 (mw).

In the table 9e, the accumulated values of I21, I21+I31, and I21+I31+I11 are shown in the upper part, the middle part, and the lower part, respectively, of the communication station 21. The accumulated values of I22, I22+I32, and I22+I32+I12 are shown in the upper row, the middle row, and the lower row, respectively, of the communication station 22.

From the result shown in the table 9e, for the communication station 21, the middle-stage result, I21+I31, is applicable within the range not exceeding the interference-threshold TH21 (=I42 [dBm/MHz]) for the communication station 21. That is, the selection unit 604 of the communication control apparatus 1 is capable of specifying the base station 32 and the base station 33 to the communication station 21.

On the other hand, with respect to the communication station 22, within a range that does not exceed the interference threshold TH22 (=140 [dBm/MHz]) for the communication station 22, I22+I32+I12, which is the result of the lower stage, corresponds. That is, the selection unit 604 of the communication control apparatus 1 is capable of specifying the base station 32, the base station 31, and the base station 33 with respect to the communication station 22.

Finally, in step S89 of FIG. 8, the selection unit 604 selects the base stations 32 and 33, which are the base stations commonly identified by the communication stations 21 and 22, as the base stations to be deployed.

Thus, according to the present embodiment, it is possible to select one or more base stations from a plurality of base stations to be deployed, in consideration of interference with a plurality of ground stations, and coverage of each base station in consideration of interference, so as not to exceed the interference value allowed by all ground stations.

Also, by outputting information about one or more base stations selected by such processing, the carrier can consider redeployment of base stations or cancellation of the deployment itself that are inappropriately scheduled to be deployed in terms of interference, and as a result, can provide communication services with reduced effects due to interference.

<Modification 1>

In the above embodiment, the antenna of each base station is assumed to be an omni-directional antenna. As a modification 1, each base station comprises a sector antenna, an example that is capable of calculating the interference value and the coverage for each sector will be described. The present modification, for example, referring to FIG. 1, the base stations 31, 32, 33 corresponds to the case corresponding to the base station apparatus comprising a sector antenna in the same base station apparatus comprising a plurality of sector antennas. Here, for example, the number of sectors is 3. In this case, the communication control apparatus 1 is capable of selecting (determining) whether or not to deploy each sector.

An example in which the first embodiment is applied to each sector of a base station will be described with reference to FIGS. 2, 4 to 5. When selecting one or more base stations to be deployed based on the interference value as in the first embodiment, the acquisition unit 1 of the communication control apparatus 1 acquires the deployment information for each sector in step S41 in FIG. 4. Here, the deployment information is associated with identification information for identifying each sector. For example, the deployment information includes identification information for sectors. Then, the interference calculation unit 202 calculates the interference value to each ground station for each sector supported by each base station (S42 in FIG. 4).

The selection unit 203 applies the processing of FIG. 5 to each sector of one base station, selects one or more sectors (S58 of FIG. 5), and outputs identification information of the selected one or more sectors as a selection result to the output unit 204.

In step S44 in FIG. 4, the output unit 204 generates and outputs information based on the selection result by the selection unit 203. For example, the output unit 204 generates and outputs a list of identification information of one or more sectors selected by the selection unit 203. Furthermore, the output unit 204 may generate and output information relating to the unselected one or more sectors.

The output unit 204 may generate and output information about each base station in consideration of a sector. For example, the output unit 204 may generate and output a result indicating that all the sectors should deploy the selected base station.

An example of providing the second embodiment to each sector of a base station will be described with reference to FIGS. 6 to 8. When selecting a base station to be deployed based on the interference value and the coverage as in the second embodiment, the acquisition unit 1 of the communication control apparatus 1 acquires deployment information for each sector in step S71 in FIG. 7. Here, the deployment information is associated with identification information for identifying each sector. For example, the deployment information includes identification information for sectors. Then, the interference calculation unit 602 calculates the interference value to each ground station for each sector supported by each base station (S72 in FIG. 7). In step S73 in FIG. 7, the coverage calculation unit 603 calculates the coverage of each base station based on the deployment information.

The selection unit 604 applies the processing of FIG. 8 to each sector of one base station, selects one or more sectors (S89 in FIG. 8), the identification information of the selected one or more sectors, and outputs the output unit 605 as a selection result. The output unit 605 generates information based on the selection result by the selection unit 604 and outputs the information in step S75 in FIG. 7. For example, the output unit 605 generates and outputs a list of identification information of one or more sectors selected by the selection unit 604. Furthermore, the output unit 605 may generate and output information relating to the unselected one or more sectors.

The output unit 605 may generate and output information about each base station in consideration of a sector. For example, the output unit 605 may generate and output a result indicating that all sectors should deploy the selected base station.

In the present modification, an example for one base station has been described, but the same description may be applied to a case of a plurality of base stations, that is, a case in which each of the plurality of base stations includes a plurality of sectors.

<Modification 2>

In the above embodiment, 5G communication system and the satellite communication system have been exemplified as the system sharing the same frequency band, but the present embodiment may be applied to two or more systems sharing the same frequency band. For example, the same frequency band can be used between a communication system for High Altitude Platform Station (HAPS) and a public communication system, or between a 5G communication system and a communication system based on a radio wave observatory.

Even in such a case, by applying the above embodiment, it is possible to appropriately deploy the communication station/base station in one system, and it is possible to suppress the deterioration of the communication quality due to the occurrence of interference.

While specific embodiments have been described above, the embodiments are illustrative only and are not intended to limit the scope of the invention. The apparatus and method described herein may be embodied in other forms than as described above. In addition, it is also possible to appropriately omit, replace, and change the above-described embodiment without departing from the scope of the present invention. Such omissions, substitutions and alterations fall within the scope of the appended claims and their equivalents and fall within the scope of the present invention.

REFERENCE SIGNS LIST

1: Communication control apparatus, 21; 22: Communication station, 31; 32; 33: Base Station, 201: Acquisition Unit, 202; Interference Calculation Unit, 203; Selection Unit, 204: Output Unit, 301: CPU, 302: ROM, 303: RAM, 304: HDD, 305: Input Unit, 306: Display Unit, 307: Communication IN, 601: Acquisition Unit, 602: Interference Calculation Unit, 603: Coverage Calculation Unit, 604: Selection Unit, 605: Output Unit

What is claimed is:

1. A communication control apparatus comprising:
at least one memory configured to store program code; and
electric circuitry including at least one of a field programmable gate array (FPGA), an application specific integrated circuit (ASIC), and at least one processor, the at least one processor being configured to execute the program code to:
acquire deployment information related to deployment of a plurality of base stations, and location information related to positions of a plurality of stationary communication stations that perform communication by sharing a frequency band with the plurality of base stations;
calculate, using the deployment information and the location information, a first plurality of interference values in a direction toward the plurality of stationary communication stations from the plurality of base stations; and
select, from the plurality of base stations, first one or more of base stations each of which have an interference value of the first plurality of interference values lower than a predetermined interference threshold set for the plurality of stationary communication stations, as to-be-deployed base stations in accordance with the deployment information; wherein
the predetermined interference threshold is individually set for each of the plurality of stationary communication stations, and
the selecting comprises:
selecting, for each of the plurality of stationary communication stations, first one or more interference values of a second plurality of interference values arranged in a predetermined order, the second plurality of interference values corresponding to each of the plurality of stationary communication stations among the first plurality of interference values, the first one or more interference values corresponding to second one or more base stations of the plurality of base stations;
accumulating, for each of the plurality of stationary communication stations, the first one or more interference values in the direction toward each of the plurality of stationary communication stations from the plurality of base stations;
identifying, for each of the plurality of stationary communication stations, a subset of the second one or more base stations of which the accumulated result of the first one or more interference values does not exceed the predetermined interference threshold set for each of the plurality of stationary communication stations; and
selecting, from the plurality of base stations, the first one or more base stations that are commonly identified for the plurality of stationary communication stations, as the to-be-deployed base stations in accordance with the deployment information, thereby suppressing co-channel interference among the plurality of base stations.

2. The communication control apparatus according to claim 1, wherein
the predetermined order is an ascending order of the first plurality of interference values.

3. The communication control apparatus according to claim 1, the electronic circuitry further configured to execute the program code to:
calculate a service providing area by each of the plurality of base stations using the deployment information, and wherein
the predetermined order is a descending order of values obtained by dividing the service providing area by the first plurality of interference values.

4. The communication control apparatus according to claim 1, the electronic circuitry further configured to execute the program code to:
generate and output at least one of information on the selected first one or more base stations and information on one or more base stations not selected from the plurality of base stations.

5. The communication control apparatus according to claim 1, wherein
the plurality of base stations are different base station apparatuses from each other.

6. The communication control apparatus according to claim 1, wherein
the plurality of base stations are base station apparatuses corresponding to a plurality of sector antennas respectively provided in a same base station apparatus.

7. The communication control apparatus according to claim 1, wherein the deployment information of the plurality of base stations includes one or more of: a latitude or a longitude with respect to each of the plurality of base stations, an antenna height of each of the plurality of base stations, a transmission power value by each of the plurality of base stations, antenna patterns of each of the plurality of base stations, and an orientation and a tilt of each of the plurality of base stations.

8. The communication control apparatus according to claim 1, wherein
the plurality of base stations are base stations in a fifth generation (5G) communication network, and the plurality of stationary communication stations are ground stations in a satellite communication network.

9. A communication control method performed using at least one processor, comprising steps of:
acquiring deployment information related to deployment of a plurality of base stations, and location information related to positions of a plurality of stationary communication stations that perform communication by sharing a frequency band with the plurality of base stations;
calculating, using the deployment information and the location information, a first plurality of interference values in a direction toward the plurality of stationary communication stations from the plurality of base stations; and
selecting, from the plurality of base stations, first one or more of base stations each which have an interference value of the first interference values lower than a predetermined interference threshold set for the plurality of stationary communication stations, as to-be-deployed base stations in accordance with the deployment information; wherein
the predetermined interference threshold is individually set for each of the plurality of stationary communication stations, and
the selecting comprises:
selecting, for each of the plurality of stationary communication stations, first one or more interference values of a second plurality of interference values arranged in a predetermined order, the second plurality of interference values corresponding to each of the plurality of stationary communication stations among the first plurality of interference values, the first one or more interference values corresponding to second one or more base stations of the plurality of base stations;
accumulating, for each of the plurality of stationary communication stations, the first one or more interference values in the direction toward each of the plurality of stationary communication stations from the plurality of base stations;
identifying, for each of the stationary communication stations, a subset of the second one or more base stations of which the accumulated result of the first one or more interference values does not exceed the predetermined interference threshold set for each of the plurality of stationary communication stations; and
selecting, from the plurality of base stations, the first one or more base stations that are commonly identified for the plurality of stationary communication stations, as the to-be-deployed base stations in accordance with the deployment information, thereby suppressing co-channel interference among the plurality of base stations.

10. A communication system including a plurality of base stations, a plurality of communication stations fixedly installed for performing communication by sharing a frequency band with the plurality of base stations, and a control apparatus, wherein
the control apparatus comprising:
at least one memory configured to store program code; and
electric circuitry including at least one of a field programmable gate array (FPGA), an application specific integrated circuit (ASIC), and at least one processor, the at least one processor being configured to execute the program code to:
acquire deployment information related to deployment of a plurality of base stations, and location information related to positions of a plurality of stationary communication stations that perform communication by sharing a frequency band with the plurality of base stations;
calculate, using the deployment information and the location information, a first plurality of interference values in a direction toward the plurality of stationary communication stations from the plurality of base stations; and
select, from the plurality of base stations, first one or more base stations each of which have an interference value of the first plurality of interference values lower than a predetermined interference threshold set for the plurality of stationary communication stations, as to-be-deployed base stations in accordance with the deployment information; wherein
the predetermined interference threshold is individually set for each of the plurality of stationary communication stations, and
the selecting comprises:
selecting, for each of the plurality of stationary communication stations, first one or more interference values of a second plurality of interference values arranged in a predetermined order, the second plurality of interference values corresponding to each of the plurality of stationary communication stations among the first plurality of interference values, the first one or more interference values corresponding to second one or more base stations of the plurality of base stations;
accumulating, for each of the plurality of stationary communication stations, the first one or more interference values in the direction toward each of the plurality of stationary communication stations from the plurality of base stations;
identifying, for each of the plurality of stationary communication stations, a subset of the second one or more base stations of which the accumulated result of the first one or more interference values does not exceed the predetermined interference threshold set for each of the plurality of stationary communication stations; and
selecting, from the plurality of base stations, the first one or more base stations that are commonly identified for the plurality of stationary communication stations, as the to-be-deployed base stations in accordance with the deployment information, thereby suppressing co-channel interference among the plurality of base stations.

11. A non-transitory communication control computer readable medium storing one or more program codes that, when executed by a computer, cause the computer to execute communication control processing, comprising:
an acquisition process for acquiring deployment information related to deployment of a plurality of base stations, and location information related to positions of a plurality of stationary communication stations that perform communication by sharing a frequency band with the plurality of base stations;
an interference calculation process for calculating, using the deployment information and the location information, a first plurality of interference values in a direction toward the plurality of stationary communication stations from the plurality of base stations; and a selection process for selecting, from the plurality of base stations, first one or more of base stations each of which have an interference value of the first plurality of interference values lower than a predetermined interference threshold set for the plurality of stationary communication stations, as to-be-deployed base stations in accordance with the deployment information; wherein the predetermined interference threshold is individually set for each of the plurality of stationary communication stations, and the selecting comprises:
   selecting, for each of the plurality of stationary communication stations, first one or more interference values of a second plurality of interference values arranged in a predetermined order, the second plurality of interference values corresponding to each of the plurality of stationary communication stations among the first plurality of interference values, the first one or more interference values corresponding to second one or more base stations of the plurality of base stations;

accumulating, for each of the plurality of stationary communication stations, the first one or more interference values in the direction toward each of the plurality of stationary communication stations from the plurality of base stations;

identifying, for each of the plurality of stationary communication stations, a subset of the second one or more base stations of which the accumulated result of the first one or more interference values does not exceed the predetermined interference threshold set for each of the plurality of stationary communication stations; and selecting, from the plurality of base stations, the first one or more base stations that are commonly identified for the plurality of stationary communication stations, as the to-be-deployed base stations in accordance with the deployment information, thereby suppressing co-channel interference among the plurality of base stations.

\* \* \* \* \*